United States Patent [19]

Collins

[11] Patent Number: 4,975,520

[45] Date of Patent: Dec. 4, 1990

[54] PRODUCTION OF ACETAL COPOLYMERS FROM GASEOUS FORMALDEHYDE AND CYCLIC ETHERS

[75] Inventor: George L. Collins, Maplewood, N.J.

[73] Assignee: Hoechst Celanese Corp., Somerville, N.J.

[21] Appl. No.: 325,424

[22] Filed: Mar. 20, 1989

[51] Int. Cl.$^5$ .............................................. C08G 4/00
[52] U.S. Cl. ................................... 528/232; 528/233; 528/241; 528/244; 528/245; 528/248; 528/250; 525/398; 525/400; 525/405; 522/162
[58] Field of Search ............... 528/232, 233, 241, 244, 528/245, 248, 250; 525/398, 400, 405; 522/162

[56] References Cited

U.S. PATENT DOCUMENTS

| | | | |
|---|---|---|---|
| 3,027,352 | 3/1962 | Walling et al. | 528/241 |
| 3,337,507 | 8/1967 | Gutweiler et al. | 528/249 |
| 3,639,347 | 2/1972 | Sugiura et al. | 528/223 |
| 3,639,349 | 2/1972 | Burg et al. | 528/249 |
| 3,803,094 | 4/1974 | Ishii et al. | 528/233 |
| 4,340,720 | 7/1982 | Grishin et al. | 528/232 |
| 4,377,667 | 3/1983 | Sakurai et al. | 525/400 |
| 4,399,272 | 8/1983 | Sakurai et al. | 528/233 |
| 4,691,000 | 9/1987 | Collart et al. | 528/244 |
| 4,758,608 | 7/1988 | Collins et al. | 522/43 |

FOREIGN PATENT DOCUMENTS 1221148  5/1960  France .

OTHER PUBLICATIONS

Collins G. L. et al., J. Polymer Sci. (Chem.) 19:1597 (1981).
Weissemel, K. et al., Kunststoffe 54:410 (1964).
Price, M. B. et al., J. Macromol. Sci. (Chem), A1(2):231 (1967).

Primary Examiner—John Kight, III
Assistant Examiner—Sam A. Acquah
Attorney, Agent, or Firm—Lyon and Lyon

[57] ABSTRACT

A process for producing oxymethylene copolymers and terpolymers is disclosed which involves the non-linear addition of gaseous formaldehyde to a cyclic ether having at least two adjacent carbon atoms (1) and, in the case of a terpolymer, to a mixture of at least one (1) and one monoethylenically unsaturated aliphatic diol formal having at least four carbon atoms in its main chain (2), or to a mixture of (1) with a (2), in the presence of a polymerization initiator at a rate controlled so as to conform to a rate determined by kinetic equations that describe the rate of decomposition of trioxane to formaldehyde during conventional copolymerization of trioxane with a cyclic ether. The process and kinetic equations of the invention are applicable to batch reactions, single stream continuous reactions and dual stream continuous reactions.

29 Claims, 7 Drawing Sheets

PRODUCTION OF ACETAL COPOLYMERS FROM GASEOUS FORMALDEHYDE AND CYCLIC ETHERS

FIELD OF THE INVENTION

This invention relates to a process of producing acetal (oxymethylene) copolymers of formaldehyde and cyclic ethers having at least two adjacent carbon atoms which involves the non-linear addition of monomeric formaldehyde, rather than a substance such as trioxane that generates formaldehyde, to the copolymerization reaction mixture.

BACKGROUND OF THE ART

Copolymers of trioxane and cyclic ethers (which term is intended to include cyclic formals) having at least two adjacent carbon atoms, e.g., ethylene oxide, 1,3-dioxolane or 1,4-butanediol formal, have a wide range of use in industry, particularly as engineering resins. The mechanical properties of these copolymers, e.g., the degree of toughness of articles molded from them, depend to a large extent upon the molecular weight of the copolymer—with property improvements generally being obtained as molecular weight increases. The desirable property of resistance to thermal decomposition is a function of the degree of randomness of the distribution of the cyclic ether comonomer in the copolymer—the more random the distribution the better the copolymer's heat resistance.

Acetal or oxymethylene copolymers, including those made from trioxane and cyclic ethers having at least two adjacent carbon atoms such as ethylene oxide, 1,3-dioxolane or 1,4-butanediol formal as the comonomer pair, are well known to the art. See, for example, Walling et al. U.S. Pat. No. 3,027,352; Weissermel, K., et al., *Kunststoffe* 54:410 (1964); Collins, G. L., et al., *J. Polymer Sci. (Chem.)* 19:1597 (1981).

These copolymers have recurring oxymethylene units, i.e., —$CH_2O$—, interspersed with oxy(higher-)alkylene units, e.g., —$CH_2CH_2O$—, and can be prepared, for example, as described in the Walling patent supra and in French Patent No. 1,221,148, by copolymerizing trioxane, the source of the —$CH_2O$— unit, with a cyclic ether having at least two adjacent carbon atoms, in the presence of an initiator or a catalyst such as a $BF_3$ dialkyletherate. Interestingly, when 1,3-dioxolane and ethylene oxide are copolymerized, it has been observed that the disappearance of the latter monomer conforms to pseudo first-order kinetics, and that the induction period for copolymerization can be eliminated by the addition of formaldehyde at a level equal to the sum of the equilibrium concentration and the molar concentration of the ethylene oxide. Price, M. B., et al., *J. Macromol. Sci. (Chem)*, A1(2):231 (1967).

It has been demonstrated that, during the copolymerization of trioxane with ethylene oxide in the presence of the polymerization initiator $BF_3$ dibutyletherate, a Bronsted acid is formed by the reaction of traces of water with the initiator. This acid complexes with trioxane causing depolymerization of the latter to formaldehyde. Thus, the species reacting with the cyclic ether in an insertion reaction is actually formaldehyde. Collins, supra.

Trioxane can be produced industrially by cyclic trimerization of aqueous formaldehyde with acid with azeotropic distillation of the trioxane as it is formed, Price, supra, while formaldehyde can be prepared commercially by cracking of gaseous trioxane. This invention obviates, in whole or in certain embodiments in part, the need to make and then purify trioxane only to decompose it to formaldehyde during copolymerization with a cyclic ether having at least two adjacent carbon atoms.

Direct copolymerization of formaldehyde and cyclic ethers having at least two adjacent carbon atoms is known in the art. Ishii, T., et al., U.S. Pat. No. 3,803,094; Grishin, B. P., et al., U.S. Pat. No. 4,340,720; Sakurai, H., et al., U.S. Pat. Nos. 4,377,677 and 4,399,272.

Ishi et al. disclose a process for copolymerizing formaldehyde and a cyclic ether in an inert organic solvent in the presence of a catalyst composed of a mixture of a methyl chelate compound, e.g., tris(acetylacetone)cobalt, with a Lewis acid, e.g., $BF_3$ diethyletherate. Two polymerization methods are disclosed, one a batch solution method wherein the catalyst is added to a solution of the reactants in organic solvent, the second a "blow method" wherein gaseous formaldehyde and 1,3-dioxolane are continuously, and at a linear rate, blown into a solution of the catalyst in an organic solvent (see, e.g., Example 25). Rate constants of thermal degradation ($K_{222}$ values) of the copolymer, which provide an estimate of the degree of randomness of the insertion of the comonomers, were high during the early stages of the solution polymerization method, but low (e.g., 0.02%/min.) at the end (see Table II). $K_{222}$ values for the below method were not provided.

Grishin et al. disclose a process for producing high molecular weight oxymethylene copolymers in which gaseous formaldehyde (generated from methanol) is fed into a solution of a cyclic ether and an ionic catalyst in an organic solvent. When the process is practiced in a continuous mode, the vapor phase (formed as the result of the exothermic heat of polymerization) is withdrawn from, then recycled to, the reaction zone continuously. In this mode, the dispersed solid copolymer is drawn off continuously, while the solvent and reactants are added in amounts equal to the amounts withdrawn. The rate of admission to the reaction vessel of the gaseous reactants is said to be linear (column 5, lines 41–48 and column 6, lines 23–30) and is selected so as to insure a predetermined unit load of formaldehyde relative to the volume of the liquid phase (column 5, lines 49–51). No information is provided regarding the extent of non-random polymerization.

The Sakurai et al. '677 patent discloses the copolymerization of gaseous formaldehyde, added at a linear rate, with propylene oxide in the presence of polyethylene glycol monobutyl ether as the inert organic solvent and $SnCl_4$ as the catalyst (column 14, lines 44–45). The degree of randomness of the copolymer is not disclosed.

The Sakurai et al. '272 patent discloses a process for producing a polyacetal copolymer wherein formaldehyde is copolymerized with an alkylene oxide, a poly(alkylene oxide), a cyclic formal or a poly(cyclic formal) in the presence of a Lewis acid and an anionic polymerization catalyst. Gaseous formaldehyde is added at a linear rate (column 9, line 53; column 10, line 2; Example 1, lines 8–10; Examples 2–3, lines 34–37). The final product exhibited a $K_{222}$ value of 0.02%/min (column 11, line 8) at the end stages of the reaction.

Collart et al. U.S. Pat. No. 4,691,000 discloses copolymers containing oxymethylene and 2-fluoromethoxyethylene repeating units wherein the —$CH_2O$— units are derived from trioxane and the 2-fluoromethoxyethylene units are derived from a fluoromethyl derivative of a cyclic ether. The rate of addition of trioxane to the reaction mixture is linear and is said to be predetermined by preliminary tests based on the desired proportion of oxymethylene units in the copolymer and the reactivity of the selected comonomer (column 3, lines 54–67). The randomness of the distribution of the 2-fluoromethoxyethylene comonomer in the copolymer is not disclosed.

None of the aforementioned patents or publications, nor any other patent or publication known to the inventor, teach a process for the preparation of an acetal copolymer by the copolymerization of formaldehyde with a cyclic ether containing at least two adjacent carbon atoms in which the rate of addition of gaseous formaldehyde to the reaction mixture is non-linear.

SUMMARY OF THE INVENTION

It has now been discovered that oxymethylene copolymers can be produced in high yield by adding gaseous formaldehyde to a copolymerization reaction mixture containing an initiator and also containing, as the other comonomer, a cyclic ether having at least two adjacent carbon atoms, at a rate of addition of formaldehyde controlled so as to conform to a rate determined by kinetic equations that describe the rate of decomposition of trioxane to formaldehyde during conventional copolymerization of trioxane with a cyclic ether or formal. The thus-produced copolymers exhibit the desirable properties of high molecular weight and randomness of insertion of the cyclic ether in the copolymer chain.

It is, therefore, an object of this invention to provide a process for producing high molecular weight oxymethylene copolymers from gaseous formaldehyde and a cyclic ether having at least two adjacent carbon atoms.

It is a further object of the invention to provide kinetic equations usable to control the non-linear rate of addition of gaseous formaldehyde to a copolymerization reaction mixture containing a cyclic ether having at least two adjacent carbon atoms so as to produce a copolymeric product with the desired properties of acceptably high molecular weight and resistance to thermal decomposition.

It is another object of the invention to provide for the imposition of the specified rate of gaseous formaldehyde addition in either batch or single stream continuous copolymerization reactions to provide oxymethylene copolymers.

It is another object of the invention to use the process of the invention in a dual stream continuous flow reactor, wherein the product produced in a first reactor is introduced continuously and at a controlled rate into a second reactor into which trioxane and formaldehyde are also being introduced simultaneously, to produce oxymethylene copolymers.

It is a further object of this invention to provide a process for producing UV-curable non-crystalline acetal terpolymers comprising formaldehyde, a cyclic ether having at least two adjacent carbon atoms and a monoethylenically unsaturated diol formal having at least four carbon atoms in its main chain, without or with the admixture of a multifunctional crosslinking monomer, using the kinetic equations of the invention to control the non-linear rate of addition of gaseous formaldehyde to the copolymerization reaction mixture.

These and other objects, as well as the nature, scope and utilization of this invention, will become readily apparent to those skilled in the art from the following description and the appended claims.

DETAILED DESCRIPTION OF THE INVENTION

A mechanistic scheme that accounts for the unique experimental features of the copolymerization of bulk trioxane with 2% (wt/wt) ethylene oxide has been developed for use in practicing this invention. According to this scheme, a primary initiating species is produced by the reaction of traces of water with a polymerization initiator, e.g., $BF_3$ dibutyletherate, to form a Bronsted acid. This acid complexes principally with the more-basic ethylene oxide, and partly with the less-basic trioxane. The latter depolymerizes to produce formaldehyde which can then react with acid-complexed ethylene oxide in an insertion reaction to form an acid-complexed dioxolane. Further insertion of formaldehyde yields an acid-complexed trioxolane. This sequence is generalized into a propagation scheme that involves propagation by expansion and ring opening of trioxane, wherein the ring opening is not of the classic Sn-2 type because of the weak nucleophilicity of trioxane. The undesirable side reaction in which formaldehyde is homopolymerized is not considered significant until all of the ethylene oxide has been consumed.

Experimental evidence for this propagation scheme has been obtained by observing the behavior of trioxane/,1,3-dioxolane copolymerizations initiated with p-nitrobenzenediazonium tetrafluoroborate. Numerical simulations of both the copolymerization and homopolymerization reactions predict the qualitative features of the experimental behavior, based on the assumption that the incorporation of oxymethylene units into the copolymer being formed occurs by the addition of formaldehyde generated by the decomposition of trioxane.

Since trioxane acts chiefly, if not exclusively, as a source of formaldehyde in these reactions, it follows that trioxane itself is not necessary for the course of this reaction. Indeed, it has now been discovered that, when gaseous formaldehyde is fed into a reaction vessel containing a cyclic ether having at least two adjacent carbon atoms and a polymerization initiator at a non-linear rate consistent with the rate of formaldehyde generation from trioxane in conventional copolymerization reactions in which trioxane is used with such cyclic ether or formal, an acetal copolymer of formaldehyde with the cyclic ether is produced that has the highly desirable characteristics of high molecular weight and a sufficiently random distribution of carbon-carbon containing moieties within the polymer chains to give copolymers having a high degree of resistance to thermal decomposition.

A differential equation that provides this non-linear rate of addition of gaseous formaldehyde was developed as shown below. The component reactions that represent the decomposition of trioxane to formaldehyde and the copolymerization of this formaldehyde with a cyclic ether having two or more adjacent carbon atoms are shown in Table I. The symbols used in this and subsequent tables, as well as in the remainder of the specification, are:

FSM = fast site in melt
FSS = fast site on surface of polymer
SS1 = slow site type 1
SS2 = slow site type 2
FS = fast site
TOX = trioxane
TOXP = trioxepane
FA = formaldehyde
DOX = 1,3-dioxolane and trioxepane
EO- = ethylene oxide
MAL = methylal
FAC = formic acid
MOH = methanol
POL = solid polymer
P = polymer in solution

TABLE I

| REACTION NO. | REACTION |
|---|---|
| 1 | FSM + TOX → FSM |
| 2 | FSM → FSM + TOX |
| 3 | FSS + TOX → FSS |
| 4 | FSS → FSS + TOX |
| 5 | FSS + FA → FSS |
| 6 | FSS → FSS + FA |
| 7 | FSM + FA → FSM |
| 8 | FSM → FSM + FA |
| 9 | FS + H$_2$O → FS |
| 10 | FS + MAL → FS |
| 11 | FS + FAC → FS |
| 12 | FS + MOH → FS |

TABLE I-continued

| REACTION NO. | REACTION |
|---|---|
| 13 | FS + POL → FS |
| 14 | FS + EO → SS1 |
| 15 | SS1 → FS + EO |
| 16 | SS1 + EO → SS1 |
| 17 | SS1 + FA → SS2 |
| 18 | SS2 + EO → SS1 |
| 19 | SS2 + EO → SS1 + DOX |
| 20 | SS2 → FS + DOX |
| 21 | FS + DOX → SS2 |
| 22 | SS2 + FA → FS |
| 23 | SS2 + DOX → SS2 |
| 24 | SS1 + H$_2$O → FS |
| 25 | SS1 + MAL → FS |
| 26 | SS1 + FAC → FS |
| 27 | SS1 + MOH → FS |
| 28 | SS2 + H$_2$O → FS |
| 29 | SS2 + MAL → FS |
| 30 | SS2 + FAC → FS |
| 31 | SS2 + MOH → FS |

In Table 1, SSI represents the ethylene oxide-type cyclic oxonium active sites as depicted in the following copropagation

In Table 1, SS2 represents the cyclic acetal-type cyclic oxonium active sites as depicted in the following copropagation reactions:

FSM and FSS have different reactivity because of the heterogeneous nature of the reaction; FSS reacts faster than FSM. FS is the sum of FSM and FSS in the numerical accounting.

The forward rate of each component reaction involving propagation or copropagation can be represented as follows:

RATE1=K1*CFSM*CTOX

RATE2=K2*CFSM*CP

RATE3=K3*CFSS*CTOX

RATE4=K4*CFSS*CP

RATE5=K5*CFSS*CFA

RATE6=K6*CFSS*CP

RATE7=K7*CFSM*CFA

RATE8=K8*CFSM*CP

RATE14=K14*CFS*CEO

RATE15=K15*CSSI

RATE16=K16*CSSI*CEO

RATE17=K17*CSSI*CFA

RATE18=K18*CSS2*CEO

RATE19=K19*CSS2*CEO

RATE20=K20*CSS2

RATE21=K21*CFS*CDOX

RATE22=K22*CSSI*CFA

RATE23=K23*CSS2*CDOX

The character "*" indicates multiplication. The letter "K" represents the rate constant and "C" the concentration of the reaction components. Each of the above equations represents the differential equation that describes the forward rate of each component reaction making up the propagation and copropagation steps for the mechanistic scheme. The reactions not listed here are transfer reactions that affect molecular weight as opposed to comonomer incorporation. The equations which describe each component concentration are composed of the equations listed above and form a set of coupled differential equations. The solution of those equations provides a profile of concentration versus time for each component.

The computer program found at the end of this specification (Table III) shows how these differential equations are coded into the computer program in calculable form. It is this program that calculates the concentration of each chemical component that will determine the profile of formaldehyde concentration necessary to achieve an effective reaction. The complexity of the set of differential equations precludes an analytical solution for each component with time of reaction as the independent variable. What the program does is solve these equations numerically rather than analytically. The computer program shown below in Table III provides only that portion of the total program that calculates the differential rates for each component. Any integration technique can be used to complete this computer program, such as the Modified Euler method, the Runge-Kutta method, or the Romberg technique; preferred is the Modified Euler method.

Figure 1:
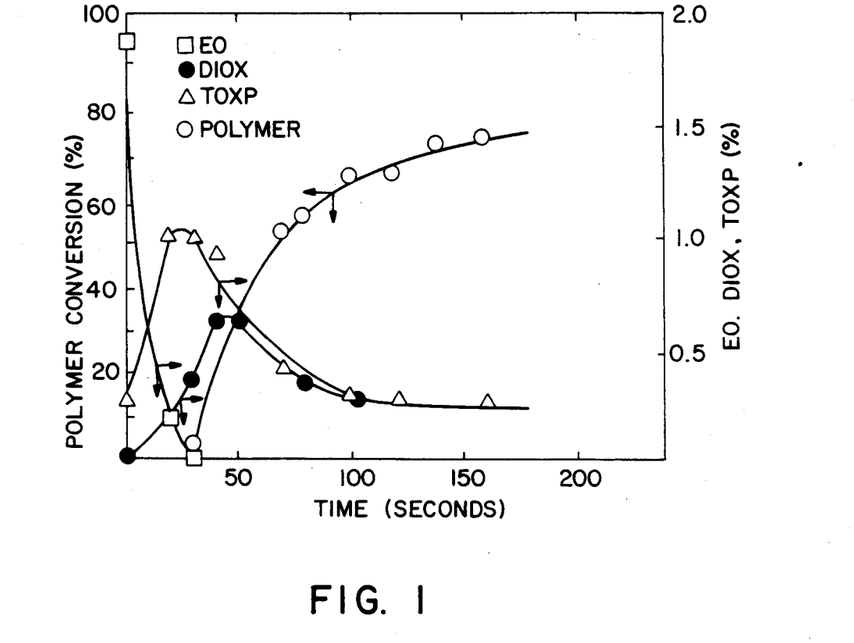
FIG. 1 shows the time course of polymer conversion and the relative amounts of ethylene oxide, 1,3-dioxolane and trioxepane in a copolymerization batch reaction mixture at 80° C.
Figure 2:
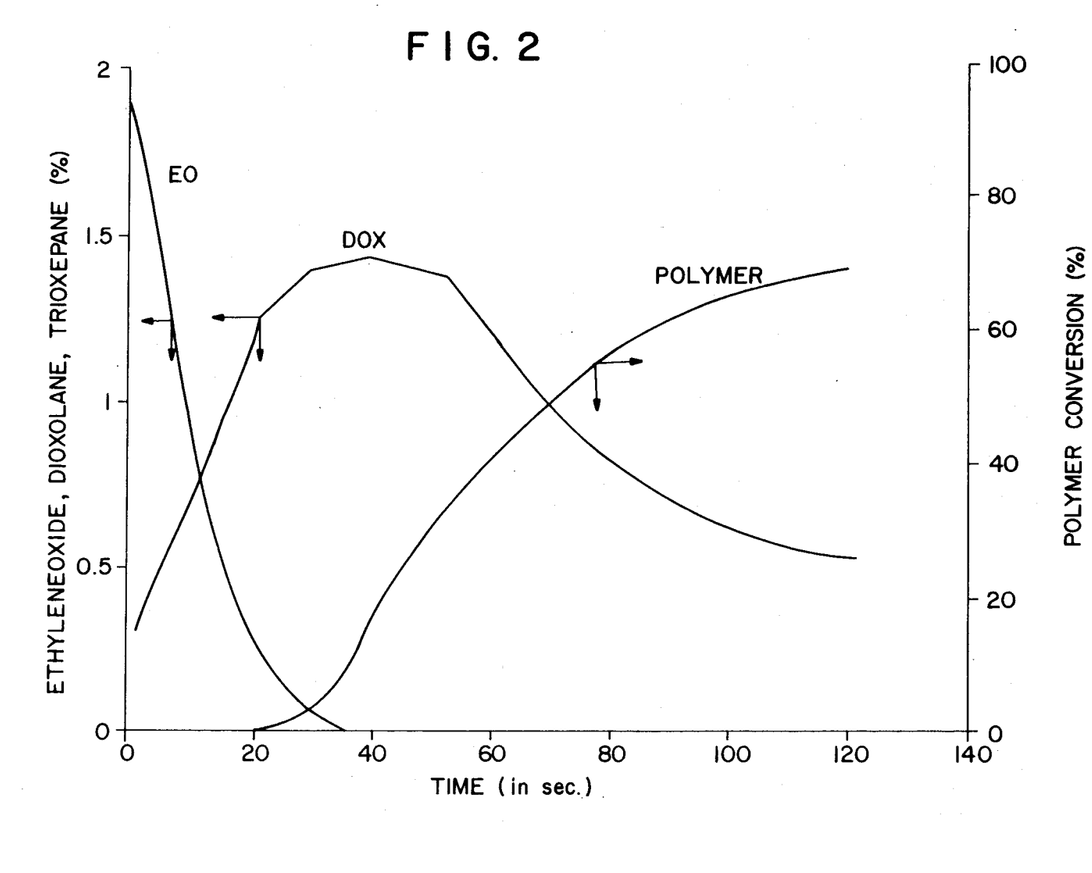
FIG. 2 shows digitized experimental data derived from FIG. 1 combining dioxolane (DIOX) and trioxepane (TOXP) concentrations into a single component DOX.
Figure 3:
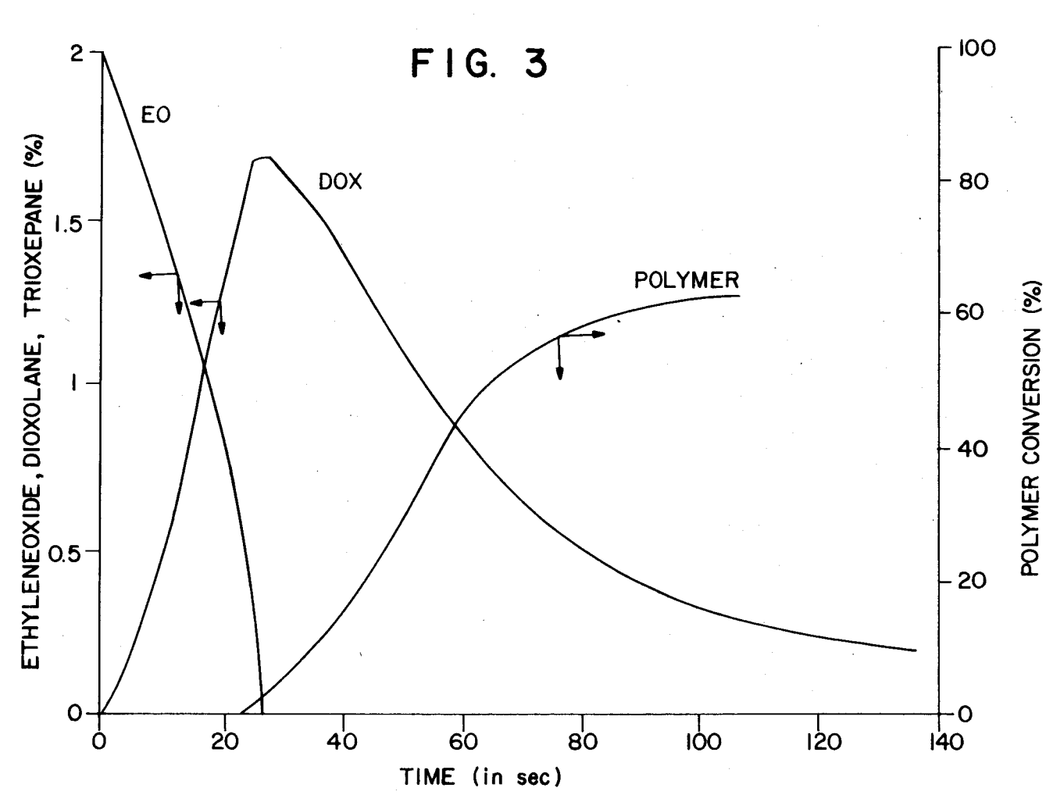
FIG. 3 is a plot of component profiles calculated by differential rate equations in accordance with this invention.

The method of collecting experimental data to verify this numerical solution is as follows. A reaction apparatus is assembled consisting of a dual stirred tube reactor fitted with a Chesapeake brand stirrer bearing that allows a spiral stirrer to be fitted into the reactor through an "O" ring seal, thus minimizing the escape of volatile reactants. At a specified time (e.g., 0 to 20 seconds at 10–20 second intervals) after the initiator (e.g., 1.2 ml of a cyclohexane solution of $BF_3$ dibutyletherate) has been injected into 2.0 ml of the molten (70°–80° C.) mixture of trioxane and ethylene oxide, an equal volume of quench solution (e.g., 0.1% w/v tributylamine in water) is injected into the reaction mixture. After stirring for 5–20 minutes, samples of the quenched reaction mixture are prepared for analysis by gas chromatography. The components of interest in the analytical determinations are ethylene oxide, trioxane, dioxolane and trioxepane. The analysis of EO is accomplished by a gas chromatography-hydrolysis procedure [Chen, C., *J. Polymer Sci.. Chem. Ed.* 13:1183–1208 (1975)]. The time courses for both the percent polymer conversion and the percentages of EO, DIOX and TOXP in the reaction mixture at a batch temperature of 80° C. are shown in FIG. 1. Solid polymer formation began at about 30 seconds and reached a maximum rate at about 150 seconds. The same experimental data was digitized in FIG. 2, with DIOX and TOXP being combined into a single species, "DOX", because of the similarity of the properties of these two components. FIG. 3 shows the results of the calculated component profiles for comparison, calculations being performed by the rate equation of the invention as follows:

The differential rate expression for formaldehyde concentration is given by variable DC(2) in the program (see Table III, second page, wherein V =Rate):

DC(2)= —Rate5+Rate6—Rate7+Rate8—1.5-*Rate17—Rate22

Figure 4:
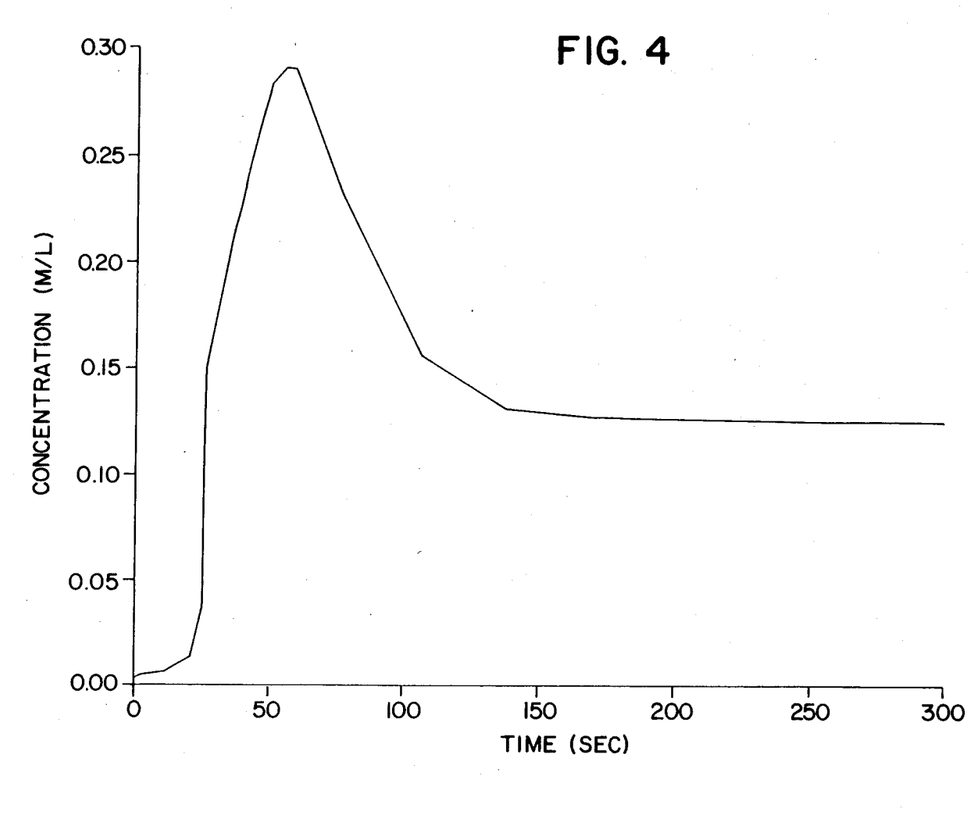
FIG. 4 shows the formaldehyde concentration profile necessary to maintain an effective copolymerization reaction, this profile being obtained from a numerical solution of a component differential rate equation in accordance with this invention.

It is the numerical solution of the component differential equation that provides the profile of formaldehyde concentration necessary to maintain an effective acetal copolymer reaction. In terms of the production of an acetal copolymer from formaldehyde and a cyclic ether containing at least two adjacent carbon atoms, it is this profile that determines how formaldehyde should be added. That profile is shown in FIG. 4, and a table of concentration values is provided in Table II.

TABLE II

| FORMALDEHYDE CONCENTRATION PROFILE | | |
|---|---|---|
| N | TIME (SEC) | CONCENTRATION (M/L) |
| 1 | 0 | .0007 |
| 2 | .008 | .7074E-03 |
| 3 | .04 | .7359E-03 |
| 4 | .168 | .8309E-03 |
| 5 | .328 | .001271 |
| 6 | .84 | .003361 |
| 7 | 1.86 | .004827 |
| 8 | 3.91 | .005652 |
| 9 | 12.1 | .007429 |
| 10 | 20.3 | .01359 |
| 11 | 25.4 | .03698 |
| 12 | 26.7 | .106 |
| 13' | 28 | .138 |
| 14 | 28.9 | .153 |
| 15 | 29.4 | .158 |
| 16 | 30 | .161 |
| 17 | 30.5 | .165 |
| 18 | 31.1 | .168 |
| 20 | 32.3 | .174 |
| 21 | 32.8 | .177 |

TABLE II-continued

FORMALDEHYDE CONCENTRATION PROFILE

| N | TIME (SEC) | CONCENTRATION (M/L) |
|---|---|---|
| 22 | 33.6 | .181 |
| 23 | 34.4 | .185 |
| 24 | 35.1 | .189 |
| 25 | 37.2 | .198 |
| 26 | 38.2 | .205 |
| 27 | 39.5 | .211 |
| 28 | 40.5 | .218 |
| 29 | 41.8 | .224 |
| 30 | 43.6 | .231 |
| 31 | 45.6 | .245 |
| 32 | 48.7 | .259 |
| 33 | 51.8 | .273 |
| 34 | 54.9 | .284 |
| 35 | 59 | .29 |
| 36 | 63 | .29 |
| 37 | 79.4 | .233 |
| 38 | 108 | .155 |
| 39 | 138 | .131 |
| 40 | 168 | .127 |
| 41 | 198 | .126 |
| 42 | 228 | .125 |
| 43 | 258 | .124 |
| 44 | 288 | .124 |
| 45 | 300 | .123 |

The symbol "E-03" in numbers 2–4 in Table II represent the method used by the computer to express exponents of 10; e.g., $E-03 = 10^{-3}$.

The differential equation predicts that rates of addition of gaseous formaldehyde to reaction mixtures based upon the formaldehyde concentration profile will produce the desirable results of (1) avoiding homopolymerization of formaldehyde (at least until the cyclic ether is depleted), (2) obtaining an oxymethylene copolymer of high molecular weight and in high yield, and (3) ensuring random insertion of oxy(higher)alkylene units from the cyclic ether or in the propagated acetal copolymer chain.

Figure 5:
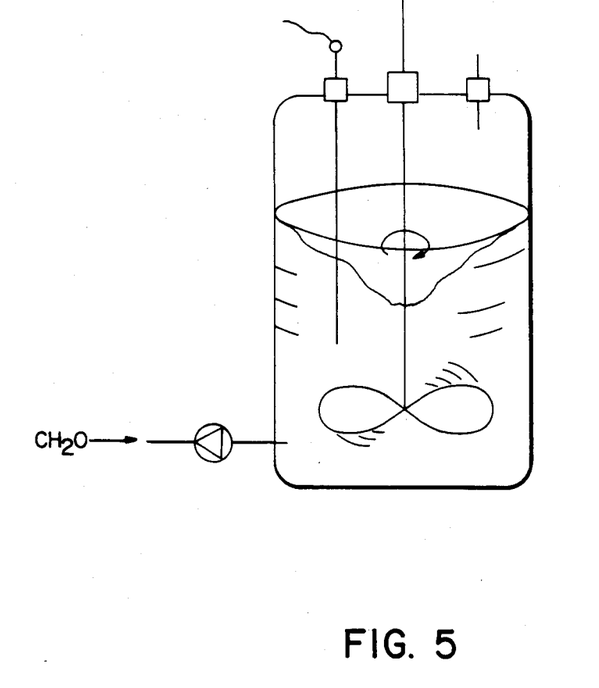
FIG. 5 is a diagram of a batch reactor which can be used for the copolymerization of formaldehyde and a cyclic ether when practicing this invention. In carrying out such copolymerization in this reactor the calculated negative of the formaldehyde consumption as predicted by the kinetic simulation is imposed.

The differential equation of the invention is used to regulate the addition of gaseous formaldehyde, preferably via a gas flow control valve, into a batch reactor (FIG. 5) containing a cyclic ether and a polymerization initiator such as a coordination complex of boron trifluoride with a dialkyl ether, e.g., $BF_3$ diethyletherate or $BF_3$ dibutyletherate, or an electrophilic compound such as p-nitrobenzenediazonium tetrafluoraborate, or the like. Other catalysts or initiators can be used, e.g., other electrophilic compounds, ion pair catalysts, perchlorates, or the like. The concentration at which such catalysts or initiators would be introduced depends upon the relative acid strength but, in general, will range from about $10^{-4}M$ to about $10^{-3}M$. Stronger acids (e.g., $HS6F_6$) are added at lower concentrations (e.g., about $10^{-4}M$) in order to maintain nominally the same overall kinetics. This is necessary as a stronger acid will generate a more rapid consumption of formaldehyde than will a weaker acid (e.g., acetic acid) at the same concentration. The calculated negative of formaldehyde consumption, as predicted by the kinetic equation, is imposed upon the batch mode.

In a single-stream continuous process (FIG. 6), the cyclic ether, e.g., 1,3-dioxolane, ethylene oxide, propylene oxide, 1,4-butanediol formal, or the like, is introduced continuously into one end of an elongated reactor. Gaseous formaldehyde is introduced, e.g., via multiple gas flow control valves, so as to add gaseous formaldehyde at two or more separate sites over the initial segment of the reactor from about 0 to about 30% of the reactor's total length. The 0 to 30% range applies to flow rates that produce final polymer in about 100 seconds after monomer enters the reactor. This is the same time frame as is used in batch ractors (supra). The rate of addition of formaldehyde is determined by the differential rate equation of the invention. The formaldehyde addition rates at each formaldehyde metering valve will be constant but are set individually at each position so that the formaldehyde concentration profile is maintained along the length of the reactor. The oxymethylene copolymer is drawn off from the end of the reactor opposite the end at which the cyclic ether is introduced.

Figure 6:
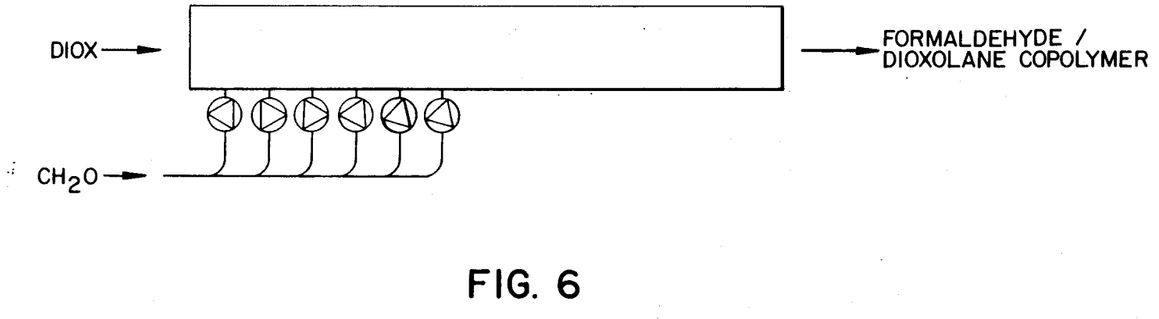
FIG. 6 is a diagram of a single stream continuous reactor for the copolymerization of formaldehyde and a cyclic ether when practicing this invention. The addition of formaldehyde must be distributed over the initial segment of the reactor.
Figure 7:
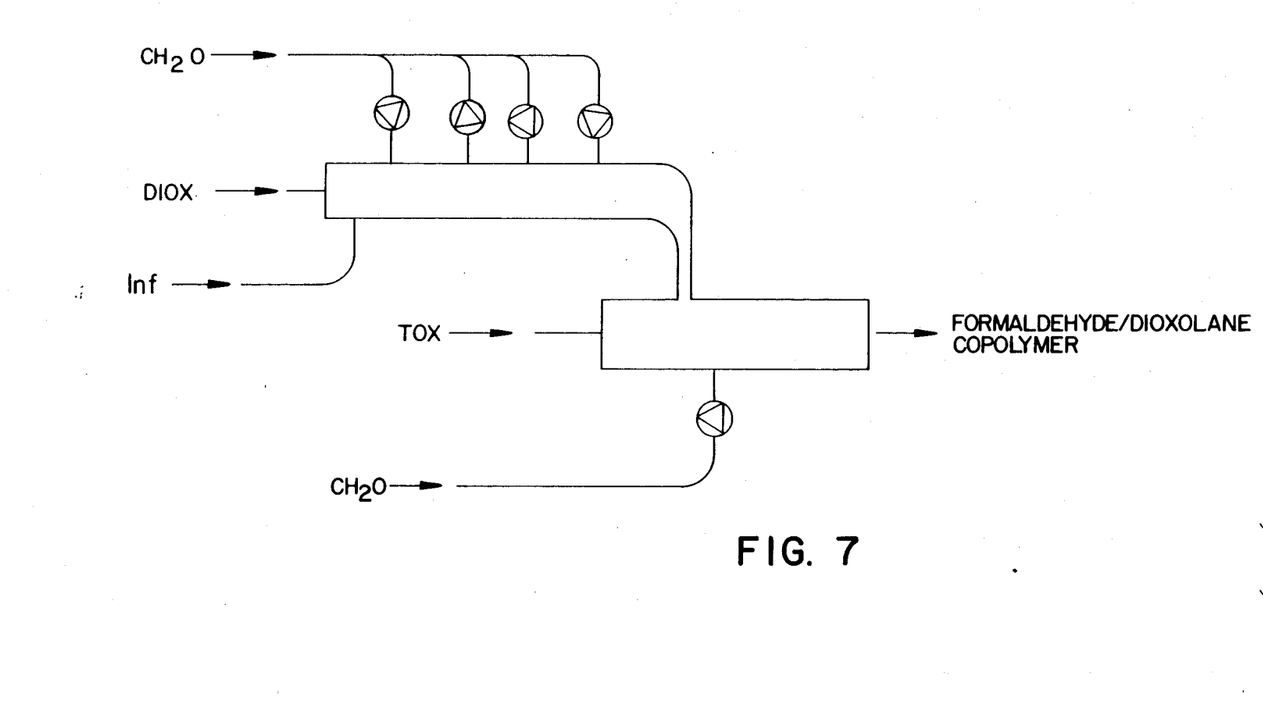
FIG. 7 is a diagram of a dual stream continuous mode reactor that combines a single stream continuous reactor such as that depicted in FIG. 6 with a second reactor, in which formaldehyde generated from trioxane is being copolymerized with a cyclic ether to form an acetal copolymer, for use in accordance with this invention. In carrying out such copolymerizations in this reactor dioxolane is reacted sufficiently with formaldehyde to produce the trioxepane active site, and a small amount of formaldehyde is added to open the trioxepane active site to form the oxocarbenium active site which can then generate formaldehyde in situ from the trioxane.

The single-stream continuous mode system of FIG. 6 can be efficiently coupled to a second reactor to produce a dual stream continuous process apparatus for improved production of acetal copolymers of trioxane with a cyclic ether having at least two adjacent carbon atoms (FIG. 7). The cyclic ether, gaseous formaldehyde and an initiator are introduced into the first reactor as described in FIG. 6. The product of the reaction of formaldehyde with the cyclic ether, presumably a trioxepane containing an active cationic site (Formula I), is then led into a second elongated reactor along with additional cyclic ether. A small amount (e.g., equal to the concentration of the active site as determined by the peak height of the DOX curve in e.g., FIG. 2) of gaseous formaldehyde is introduced into the second reactor to open the trioxepane's active cationic site to form cationic oxocarbonium active sites (Formula II).

cationic trioxepane active site (I)

cationic oxocarbonium active site (II)

This in turn will generate formaldehyde in situ from trioxane that is fed continuously into the second reactor. For the dual stream reactor configuration, the formaldehyde concentration profile for the initial 30–60 seconds of the reaction must be imposed upon the length of the comonomer stream. After formaldehyde enters the trioxane stream, generation of additional formaldehyde occurs in situ directly from the trioxane. Thereafter, copolymerization of the thus-generated formaldehyde with the cyclic ether will occur to produce a high molecular weight acetal copolymer in high yields.

The critical process variant in the production of an oxymethylene copolymer from gaseous formaldehyde by the process of this invention is formaldehyde concentration during the first 0–60 seconds of the reaction. That concentration must be kept under tight control, as indicated in the Table II calculation supra, in order to avoid, to as large an extent as possible, formaldehyde homopolymerization and ineffective incorporation of cyclic ether comonomer into the propagating copolymer chain. After that period, the variation of the formaldehyde concentration provides a means to insure effective comonomer incorporation without unnecessary pressure build up or formaldehyde losses.

The process of this invention provides numerous advantages: (1) it allows one to obtain better polymer reproducibility by using the monomer of addition (i.e., formaldehyde) under a calculatable control; (2) it enables one to inject formaldehyde as a reactant in art-recognized processes for copolymerizing trioxane with a cyclic ether to start the reaction or stimulate an already begun but sluggish reaction; (3) dual stream continuous mode operation results in incremental increases in reactor productivity based upon trioxane residence time; (4) it provides greater latitude in the choice of initiator; and (5) it makes accessible acetal copolymerization reactions that occur through weakly electrophilic active sites.

The process of this invention is also usable in producing terpolymers in an improved manner. For example, commonly-assigned Collins et al., U.S. Pat. No. 4,758,608, issued July 19, 1988, discloses UV-curable non-crystalline acetal terpolymers of trioxane, 1,3-dioxolane and a monoethylenically unsaturated aliphatic diol formal having at least four carbon atoms in its main chain (e.g., 4,7-dihydro-1,3-dioxepin). These terpolymers, when admixed with a multifunctional cross-linking monomer (e.g., 1,6-hexanediol diacrylate) and a photosensitizer (e.g., benzoin isobutyl ether), can be cured to an insoluble, non-tacky rubbery state using UV radiation. The terpolymers disclosed in the Collins et al. patent can be prepared by bulk polymerizing the comonomers in a suitable organic solvent and/or suspending vehicle, in the presence of a cationic polymerization initiator such as p-nitrobenzene diazoniumfluoroborate, $BF_3$, a $BF_3$ etherate, trifluoromethanesulfonic acid, or the like. These terpolymers can also be prepared by the process of this invention by (1) replacing trioxane with gaseous formaldehyde; (2) using a batch reactor such as in FIG. 5 or a continuous reactor as in FIG. 6; and (3) using the differential rate equation of the invention to regulate the addition of gaseous formaldehyde into a batch reactor containing 1,3-dioxolane, a monoethylenically unsaturated aliphatic diol having at least four carbon atoms in its initiator. The production of terpolymer by this improved method requires only that the differential rate of formaldehyde addition imposed on the inlet valves of the reactor be adjusted to allow for the incorporation of this additional comonomer.

There follows below in Table III that portion of a computer program for the numerical solution of a differential rate equation in accordance with this invention that codes the differential rate expressions for formaldehyde addition concentration profiles for use when practicing this invention. The entire program provides the technique for integrating these expressions. Any integration technique can be used with this computer program, such as the Modified Euler method, the Runge-Kutta method, or the Romberg technique.

The above discussion of this invention is directed primarily to preferred embodiments and practices thereof. It will be readily apparent to those skilled in the art that further changes and modifications in the actual implementation of the concepts described herein can easily be made without departing from the spirit and scope of the invention as defined by following claims.

TABLE III

COMPUTER PROGRAM FOR DIFFERENTIAL
RATE EXPRESSIONS FOR FORMALDEHYDE ADDITION

```
0172        DH = O
0173   C    TRIOXANE OPENING
0174        U(1) = RK(1) * CFSM * CTOX
0175        DH = DH + 2200 * U(1)
0176        U(2) = RK(2) * CFSM * CP
0177        DH = DH - 2200 * U(2)
0178        U(3) - RK(3) * CFSS * CTOX
0179        DH = DH + 5200 * U(3)
0180        U(4) = RK(4) * CFSS * CP
0181        DH = DH - 5200 * U(4)
0182   C
0183   C    FORMALDEHYDE POLYMERIZATION AND DEPOLYMERIZATION
0184   C
0185        U(5) = RK(5) * CFSS * CFA
0186        DH = DH + 10700 * U(5)
0187        U(6) = RK(6) * CFSS * CP
0188        DH = DH - 10700 * U(6)
0189        U(7) = RK(7) * CFSM * CFA
0190        DH = DH + 8000 * U(7)
0191        U(8) = RK(8) * CFSM * CP
0192        DH = DH - 8000 * U(7)
0193   C
0194   C    TRANSFER WITH FAST BITES
0195   C
0196        U(9) = RK(9) * CFS * CH20
0197        U(10) = RK(10) * CFS * CMAL
0198        U(11) = RK(11) * CFS * CFAC
0199        U(12) = RK(12) * CFS * CMOH
0200   C    HYDRIDE TRANSFER
0201        U(13) = RK(13) * CFS * CPFA
0202   C
0203   C    COPOLYMERIZATION REACTIONS
0204   C
0205        U(14) = RK(14) * CFS * CEO
0206        DH = DH + 1000 * U(14)
0207        U(15) = RK(15) * CSS1
0208        DH = DH - 1000 * U(15)
0209        U(16) = RK(16) * CSS1 * CEO
0210        DH = DH + 1000 * U(16)
0211        U(17) = RK(17) * CSS1 * CFA
0212        DH = DH + 10700 * U(17)
```

TABLE III-continued
COMPUTER PROGRAM FOR DIFFERENTIAL RATE EXPRESSIONS FOR FORMALDEHYDE ADDITION

```
0213                U(18) = RK(18) * CSS2 * CEO
0214                DH = DH + 200 * U(18)
0215                U(19) = RK(19) * CSS2 * CEO
0216                DH = DH + 200 * U(19)
0217                U(20) = RK(20) * CSS2
0218                DH = DH - 100 * U(20)
0219                U(21) = RK(21) * CFS * CDOX
0220                DH = DH + 100 * U(21)
0221                U(22) = RK(22) * CSS2 * CFA
0222                DH = DH + 10000 * U(22)
0223                U(23) = RK(23) * CSS2 * CDOX
0224 C
0225                U(24) = RK(24) * CSS1 * CH2O
0226                U(25) = RK(25) * CSS1 * CMAL
0227                U(26) = RK(26) * CSS1 * CFAC
0228                U(27) = RK(27) * CSS1 * CMOH
0229                U(28) = RK(28) * CSS2 * CH2O
0230                U(29) = RK(29) * CSS2 * CMAL
0231                U(30) = RK(30) * CSS2 * CFAC
0232                U(31) = RK(31) * CSS2 * CMOH
0233 C
0234 C              SUM THE RATE OF ACCUMULATION OF EACH SPECIES
0235 C
0236 C    TOX:
0237                DC(1) = -U(1) + U(2) - U(3) + U(4)
0238 C    FA:
0239                DC(2) = -U(5) + U(6) - U(7) + U(8) - 1.5*U(17) - U(22)
0240 C    PFA:
0241                DC(3) = -3 * DC(1) - DC(2) + U(14) - U(15) - U(20) +
0242        *       U(21) * 1.5*( U(18) + U(22) + U(23) )
0243 C    PEO
0244                DC(4) = U(18) + U(22) + U(23)
0245 C    ETH:
0246                DC(5) = U(16)
0247 C    FS:
0248                UT1 = U(24) + U(25) + U(26) + U(27)
0249                UT2 = U(28) + U(29) + U(30) + U(31)
0250                DC(6) = -U(14) + U(15) + U(20) - U(21) + U(22) + UT1 + UT2
0251 C    SS1:
0252                DC(7) = U(14) - U(15) - U(17) + U(18) + U(19) - UT1
0253 C    SS2:
0254                DC(8) = U(17) - U(18) - U(19) - U(20) + U(21) - U(22) - UT2
0255 C    EO:
0256                DC(9) = -U(14) + U(15) - U(16) - U(18) - U(19)
0257 C    DOX:
0258                DC(10) = U(19) + U(20) - U(21) - U(23)
0259 C    H2O
0260                DC(11) = -U(9) - U(24) - U(28)
0261 C    MAL:
0262                DC(12) = -U(10) - U(25) - U(29)
0263 C    FAC:
0264                DC(13) = -U(11) - U(26) - U(30)
0265 C    MOH:
0266                DC(14) = -U(12) - U(27) - U(31)
0267 C    EOS:
0268                DC(15) = 2. *(U(10) + U(25) + U(29)) + U(12) + U(13) + U(27) + U(31)
0269 C    ECU:
0270                DC(16) = 2. *(U(9) + U(11) + U(24) + U(26) + U(28) + U(30))
0271                + U(12) + U(13) + U(27) + U(31)
0272 C    SOL:
0273                DC(17) = 0
0274 C    CAL/SEC. L.
0275                DC(NDEP) = DH
0276                IF(IPR(S) NE 1) 00 TO 196
0277                CX(NDEP) = OX(NDEP)
0278                PRINT 3. TIME. DT
0279                PRINT 876, CFSS, CTOX, CP, CFA
0280                PRINT 1
0281                DO 920 J = 1, NDEP
0282                RR = RK(J) / RK(23)
0283 920            PRINT 2, LAB(J), CX(J), DC(J), J, (LASR(K,J), K = 1,5), RK(J),
0284        *       U(J), RR, RKV(J)
0285 C
```

I claim:

1. A process for producing an oxymethylene copolymer which comprises adding to a reaction mixture comprising a cyclic ether having at least two adjacent carbon atoms and a polymerization initiator, gaseous formaldehyde at a non-linear rate determined by the differential rate equation for the decomposition of trioxane to formaldehyde during copolymerization of trioxane with the cyclic ether.

2. The process of claim 1 wherein said polymerization initiator is a $BF_3$ dialkyl ether coordination complex.

3. The process of claim 2 wherein the initiator is $BF_3$ dibutyletherate.

4. The process of claim 2 wherein the initiator is $BF_3$ diethyletherate.

5. The process of claim 1 wherein said polymerization initiator is strongly electrophilic.

6. The process of claim 5 wherein the initiator is p-nitrobenzenediazonium tetrafluoroborate.

7. The process of claim 1 wherein said cyclic ether is a lower alkylene oxide.

8. The process of claim 7 wherein the cyclic ether is ethylene oxide.

9. The process of claim 1 wherein said cyclic ether is 1,3-dioxolane.

10. The process of claim 1 wherein said cyclic ether is 1,4-butanediol formal.

11. The process of any one of claims 1-10, inclusive, carried out as a batch process.

12. The process of any one of claims 1-10, inclusive, carried out as a single-stream continuous process in which the cyclic ether is introduced continuously into one end of an elongated reactor, gaseous formaldehyde is introduced at two or more separate sites in an initial segment of the elongated reactor contiguous to the end thereof into which the cyclic ether is introduced, and the copolymer is drawn off from the end of the elongated reactor opposite the end at which the cyclic ether is introduced.

13. A process of continuously producing an oxymethylene copolymer which comprises continuously introducing a cyclic ether into one end of an elongated reactor containing a polymerization initiator, introducing gaseous formaldehyde at two or more separate sites in an initial segment of said elongated reactor contiguous to the end thereof into which the cyclic ether is introduced, said gaseous formaldehyde being introduced at a non-linear rate determined by the differential rate equation for the decomposition of trioxane to formaldehyde during copolymerization of the cyclic ether, drawing off trioxepane copolymer from the end of the elongated reactor opposite the end at which the cyclic ether is introduced, introducing said drawn-off activated cyclic acetal into a second reactor and reacting said drawn-off activated cyclic acetal therein with continuously added trioxane and an amount of gaseous formaldehyde sufficient to form an oxocarbenium active site from the trioxepane active cationic site capable of generating formaldehyde from trioxane.

14. The process of claim 13 wherein said polymerization initiator is a $BF_3$ dialkyletherate.

15. The process of claim 14 wherein the initiator is $BF_3$ diethyletherate.

16. The process of claim 14 wherein the initiator is $BF_3$ dibutyletherate.

17. The process of claim 13 wherein said polymerization initiator is strongly electrophilic.

18. The process of claim 17 wherein the initiator is p-nitrobenzenediazonium tetrafluoroborate.

19. The process of claim 13 wherein said cyclic ether is ethylene oxide.

20. The process of claim 13 wherein said cyclic ether is propylene oxide.

21. The process of claim 13 wherein said cyclic ether is 1,3-dioxolane.

22. The process of claim 13 wherein said cyclic ether is 1,4-butanediol formal.

23. A process for producing a UV-curable non-crystalline acetal terpolymer which comprises adding to a reaction mixture comprising a cyclic ether having at least two adjacent carbon atoms, a monoethylenically unsaturated aliphatic diol formal having at least four carbon atoms in its main chain and a cationic polymerization initiator, gaseous formaldehyde at a non-linear rate determined by the differential rate equation for the decomposition of trioxane to formaldehyde during copolymerization of trioxane with said cyclic ether.

24. The process of claim 23 wherein said cyclic ether is selected from among ethylene oxide, propylene oxide, 1,3-dioxolane and 1,4-butanediol formal.

25. The process of claim 23 wherein said monoethylenically unsaturated aliphatic diol formal is selected from among 4,7-dihydro-1,3-dioxepin and 2-n-hexene-1,4-diol formal.

26. The process of claim 23 wherein said cationic polymerization initiator is selected from among p-nitrobenzene diazoniumtetrafluoroborate, $BF_3$, a $BF_3$ dialkyl etherate and trifluoromethanesulfonic acid.

27. The process of any one of claims 23-26, inclusive, carried out as a batch process.

28. The process of any one of claims 23-26, inclusive, carried out as a single-stream continuous process in which said cyclic ether and said monoethylenically unsaturated aliphatic diol formal are introduced continuously into one end of an elongated reactor, gaseous formaldehyde is introduced at two or more separate sites in an initial segment of said elongated reactor contiguous to the end thereof into which said cyclic ether and said monoethylenically unsaturated aliphatic diol formal are introduced, and the terpolymer is drawn off from the end of said elongated reactor opposite the end at which the reactants are introduced.

29. A process for producing an oxymethylene copolymer which comprises adding to a reaction mixture comprising a cyclic ether having at least two adjacent carbon atoms and a polymerization initiator, gaseous formaldehyde at a non-linear rate determined by the differential rate equation for the decomposition of trioxane to formaldehyde during copolymerization of trioxane with the cyclic ether, said equation comprising:

$$DC(2) = -RATE5 + RATE6 - RATE7 + RATE8 - 1.5*RATE17 - RATE22$$

wherein $RATE5 = K_5*CFSS*CFA$; $RATE6 = K_6*CFSS*CP$; $RATE7 = K_7*CFSM*CFA$; $RATE8 = K_8CFSM*CP$; $RATE17 = K_{17}*CSSI*CFA$; and $RATE22 = K_{22}*CSS2*CFA$, wherein "$K_n$"=a rate constant, "*"=multiplication, "C"=concentration, "FSS"=fast site on surface of polymer, "FA"=formaldehyde, "P"=polymer in solution; "FSM"=fast site in melt, "SS1"=slow site type 1, and "SS2"=slow site type 2, wherein SS1 represents the copropagation of an oxycarbenium cation with a cyclic ether, and SS2 represents the copropagation reaction of a cyclic oxonium cation with formaldehyde, and wherein DC(2) is solved by the computer program of Table III of the specification.

* * * * *